Patented Sept. 18, 1951

2,567,930

UNITED STATES PATENT OFFICE 2,567,930
PREPARATION OF EPOXY COMPOUNDS BY OXIDATION OF CIS-MONOOLEFINE COMPOUNDS

Thomas W. Findley and Daniel Swern, Philadelphia, Pa., assignors to the United States of America as represented by the Secretary of Agriculture No Drawing. Application January 30, 1945,
Serial No. 575,316

8 Claims. (Cl. 260—348.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the oxidation of unsaturated materials, and more particularly to a process for the preparation of epoxy compounds by oxidizing straight-chain aliphatic cis-monoolefine compounds, such as cis-monoolefines, cis-monoolefine acids, esters of such acids, cis-monoolefine alcohols, etc., containing more than four carbon atoms, with aliphatic per-acids, such as peracetic, perbutyric, etc., dissolved in acid solution, such as acetic acid. Such epoxy compounds are useful as chemical intermediates in organic synthesis and in the preparation of plastics, rubber-like materials, etc.

We have found that epoxy compounds may be prepared directly in good yield by the oxidation of straight-chain aliphatic cis-monoolefine compounds containing more than four carbon atoms with aliphatic per-acids, such as peracetic, perbutyric acid, etc., in an organic acid solution of the corresponding aliphatic carboxylic acid, such as acetic acid, butyric acid, etc., by proper regulation of the reaction conditions. In the reaction the double bond of the monoolefine compound is broken and oxygen is added thereto to form the epoxy compound without otherwise altering the molecular structure of the monoolefine compound. The cis-monoolefine compounds applicable to the invention include, among others, such cis-monoolefine acids as oleic, ricinoleic, undecylenic, palmitoleic, petroselinic, vaccenic, erucic, etc.; the esters of these acids; the amylenes; cis-monoolefine alcohols, such as selachyl alcohol, the decenols, tetradecenols, hexadecenols, etc.; synthetic monoglycerides, such as glycerol monooleate and glycerol monoricinoleate, and others.

The following examples are illustrative of the invention.

Example I

To 77 cc. of a well stirred glacial acetic acid solution containing 0.0735 mole of peracetic acid at room temperature is added 17.5 g. (0.062 mole) of oleic acid. The reaction is exothermic and requires cooling.

After about 2 hours at room temperature, the reaction mixture is poured into ice water, this aqueous solution filtered and the precipitate washed free from acetic acid. The precipitate is then dried, yielding 17.2 g. of a product comprising 9,10-epoxystearic acid mainly. The neutralization equivalent which was calculated to be 298.5 was found to be 298. The epoxy oxygen calculated to be 5.36% was found to be 4.6%. Recrystallization from acetone gave 12.0 g. of 9,10-epoxystearic acid having a melting point of about from 58.5° C. to 59.2° C.

Example II

Using the same reaction procedure as described in Example I, 10 g. of methyl oleate is oxidized for about 3 hours with 32 cc. of a glacial acetic acid solution containing 0.0366 mole of peracetic acid.

The solution is then poured into cold water and the oil obtained is separated from the aqueous solution and dissolved in ether. The ether solution is then washed free of entrained acid and dried. Evaporation of the ether yields 9.7 g. of product comprising methyl 9,10-epoxystearate mainly. The epoxy oxygen which was calculated to be 5.12% was found to be 4.5%.

Example III

Using the same reaction procedure as described in Example I, 10 g. of oleyl alcohol is oxidized for about 3 hours with 35 cc. of a glacial acetic acid solution containing 0.0401 mole of peracetic acid.

After dilution, filtration, washing and drying 10.5 g. of product comprising 9,10-epoxyoctadecanol mainly is obtained. The epoxy oxygen which was calculated to be 5.62% was found to be 5.0%. Recrystallization from acetone gave 8.5 g. of substantially pure 9,10-epoxyoctadecanol, having a melting point of about 52.5° C. to 54° C. This compound is claimed in an application filed December 8, 1944, Serial No. 567,297, now Patent No. 2,411,762, issued November 26, 1946.

Example IV

Using the same reaction and separation procedure as described in Example II, 10 g. of methyl ricinoleate is oxidized for about 3 hours with 31 cc. of a glacial acetic acid solution containing 0.0355 mole of peracetic acid.

Evaporation of the ether yields 8.7 g. of a product comprising methyl 9,10-epoxy-12-hydroxystearate mainly. The epoxy oxygen which was calculated to be 4.87% was found to be 4.2%.

Example V

Using the same reaction procedure as described in Example I, 50 g. of methyl 10,11-hendecenoate (methyl undecylenate) is oxidized for about 24 hours with 351 cc. of a glacial acetic acid solution containing 0.365 mole of peracetic acid.

The solution is then poured into cold water and the oil obtained is separated, as described in Example II. The product is a pale-yellow oil comprising methyl 10,11-epoxyhendecanoate. The epoxy oxygen which was calculated to be 7.47% was found to be 5.23%. Fractional distillation yielded 22 g. of methyl 10,11-epoxyhendecanoate, having a boiling point of about from 87° C. to 93° C. at 0.03 mm. of mercury. The epoxy oxygen was then found to be 7.28%.

*Example VI*

Using the same reaction procedure as described in Example I, 20 g. of mixed amylenes is oxidized for about 4 hours with 330 cc. of a glacial acetic acid solution containing 0.343 mole of peracetic acid.

The solution is poured into cold water, neutralized with 6 N aqueous sodium hydroxide and the reaction product extracted with ether. The ether solution is dried and distilled, without fractionation, to a maximum pot temperature of about 125° C. The distillate is then redistilled through an efficient fractionating column to a maximum pot temperature of about 85° C., yielding 3.3 g. of pot residue comprising epoxypentanes mainly. The epoxy oxygen which was calculated to be 18.2% was found to be 9.9%.

*Example VII*

To a solution of 28.3 g. of oleic acid dissolved in 240 cc. of acetone at about 5° C. is added 42.7 cc. of acetaldehyde. This solution is blown with air for about 25 hours at about 0° C. to 5° C. while being irradiated at the same time with a mercury vapor lamp. Under these conditions peracetic acid is formed and utilized "in situ."

Upon dilution of this solution with water and filtering, 27 g. of colorless semi-solid is obtained. Analysis reveals that this semi-solid contains about 28% of 9,10-epoxystearic acid which is then isolated by crystallization from acetone.

*Example VIII*

A solution consisting of 28.5 g. of oleic acid and 194 g. of butyraldehyde is blown with air for about 7 hours at about 30° C. while being irradiated at the same time with a mercury vapor lamp. Under these conditions perbutyric acid is formed and utilized "in situ."

Upon dilution with cold water and after filtering this aqueous solution, 27.5 g. of a semi-solid material is obtained. Crystallization from methanol and petroleum ether yields 6.8 g. of 9,10-epoxystearic acid.

*Example IX*

Using the same procedure as described in Example VIII, 28.5 g. of oleic acid is oxidized for about 5 hours but no cooling is employed. The reaction is exothermic and the temperature rises rapidly to about 50° C. to 55° C. Upon crystallization, 8 g. of 9,10-epoxystearic acid is obtained.

*Example X*

Using the same reaction procedure as described in Example VIII, 28.5 g. of oleic acid is oxidized for about 15 hours but no mercury vapor light is used. Upon crystallization, 1 g. of 9,10-epoxystearic acid is obtained.

*Example XI*

Using the same procedure as described in Example VII, a solution comprising 28.3 g. of oleic acid, 195 cc. of acetone, and 88.1 cc. of butyraldehyde is blown with air at about 0° C. to 5° C. for about 25 hours.

Upon dilution with cold water and filtering this resulting solution, 26 g. of a pale-yellow semi-solid is obtained. Analysis reveals that this semi-solid contains 39% of 9, 10-epoxystearic acid and upon crystallization from acetone, 5 g. of 9,10-epoxystearic acid is isolated.

Although it has been found to be most convenient to operate at the temperatures given in the examples, other temperatures may be used, provided that the epoxy compounds and per-acids are stable. Likewise, other solvents and photosensitizers besides acetone may be employed. The length of time required for the completion of the reaction is primarily dependent upon the olefine oxidized and the temperature. The shortest time necessary for the completion of the reaction at any particular temperature should be used for maximum yields of epoxy compounds.

Having thus described the invention, what is claimed is:

1. A process comprising oxidizing oleic acid with peracetic acid dissolved in acetic acid at room temperature for about two hours, then mixing the reaction mixture with ice water, and then isolating the formed precipitate, which comprises mainly 9,10-epoxystearic acid, from the resulting aqueous solution.

2. A process comprising mixing a straight-chain aliphatic cis-monoolefine compound containing more than four carbon atoms with an aliphatic per-acid selected from the group consisting of peracetic acid and perbutyric acid, respectively, in an organic acid solution of the corresponding aliphatic carboxylic acid to break the double bond of the monoolefine compound and add oxygen thereto to form an epoxy compound without otherwise altering the molecular structure of the monoolefine compound, and isolating the formed epoxy compound.

3. A process comprising mixing a straight-chain aliphatic cis-monoolefine compound containing more than four carbon atoms with peracetic acid dissolved in acetic acid to break the double bond of the monoolefine compound and add oxygen thereto to form an epoxy compound without otherwise altering the molecular structure of the monoolefine compound, and isolating the formed epoxy compound.

4. A process comprising mixing a straight-chain aliphatic cis-monoolefine acid containing more than four carbon atoms with an aliphatic per-acid selected from the group consisting of peracetic acid and perbutyric acid, respectively, in an organic solution of the corresponding aliphatic carboxylic acid to break the double bond of the monoolefine acid and add oxygen thereto to form an epoxy compound without otherwise altering the molecular structure of the monoolefine acid, and isolating the formed epoxy compound.

5. A process comprising mixing oleic acid with an aliphatic per-acid selected from the group consisting of peracetic acid and perbutyric acid, respectively, in an organic acid solution of the corresponding aliphatic carboxylic acid to break the double bond of the oleic acid and add oxygen thereto to form 9,10-epoxystearic acid, and isolating the formed 9,10-epoxystearic acid.

6. A process comprising mixing oleic acid with peracetic acid in acetic acid solution to break the double bond of the oleic acid and add oxygen thereto to form 9,10-epoxystearic acid, and isolating the formed 9,10-epoxystearic acid.

7. A process comprising passing a free-oxygen-containing gas through a solution of a straight-chain aliphatic cis-monoolefine compound containing more than four carbon atoms dissolved in an aliphatic aldehyde selected from the group consisting of acetaldehyde and butyraldehyde, to break the double bond of the monoolefine compound and add oxygen thereto to form an epoxy compound without otherwise altering the molecular structure of the monoolefine compound, and isolating the formed epoxy compound.

8. A process comprising passing a free-oxygen-containing gas through a solution of a straight-chain aliphatic cis-monoolefine compound containing more than four carbon atoms dissolved in an aliphatic aldehyde selected from the group consisting of acetaldehyde and butyraldehyde while exposing said solution to ultra violet radiation, to break the double bond of the monoolefine compound and add oxygen thereto to form an epoxy compound without otherwise altering the molecular structure of the monoolefine compound, and isolating the formed epoxy compound.

THOMAS W. FINDLEY.
DANIEL SWERN.

REFERENCES CITED

The following references are of record in the file of this patent:

UNITED STATES PATENTS

| Number | Name | Date |
|---|---|---|
| 1,483,546 | Gelissen et al. | Feb. 12, 1924 |
| 2,115,206 | Milas | Apr. 20, 1938 |
| 2,458,484 | Terry | Jan. 4, 1949 |

OTHER REFERENCES

King: J. Chem. Soc. 37 (1943), pp. 37–38.

Gilman: "Organic Chemistry An Advanced Treatise," vol. 1, second edition, pp. 634 and 635, John Wiley and Sons Inc., London, 1943.

Smit: Recueil Des Travaux Chimques Des Pays-Bas., Tome 49, pages 684 and 685.

Grant: "Hackh's Chemical Dictionary," page 593, 3rd edition, Blakiston Co., Philadelphia, 1944.

Smit: articles abstracted in Chemical Abstracts, vol 24, pp. 4261–4263 (1930).

Arbuzov et al.: articles abstracted in Chemical Abstracts, vol. 24, pp. 4285–4286 (1930).

Boeseken et al.: article abstracted in Chemical Abstracts, vol. 25, page 5403 (1931).

Stuurman: article abstracted in Chemical Abstracts, vol. 29, page 4657 (1935).

Krug et al.: German Pat. No. 730,116, abstracted in Chemical Abstracts, vol. 38, page 979 (1944).